United States Patent [19]

Harriger

[11] Patent Number: 4,546,990
[45] Date of Patent: Oct. 15, 1985

[54] HYDRAULIC DRIVE SYSTEM FOR BICYCLES AND THE LIKE

[76] Inventor: George A. Harriger, 1217 E. 7th Ave., Houghton, Mich. 49931

[21] Appl. No.: 529,590

[22] Filed: Sep. 6, 1983

[51] Int. Cl.$^4$ .............................................. B62M 19/00
[52] U.S. Cl. .................................. 280/216; 280/259; 60/452; 60/491
[58] Field of Search ................. 280/259, 216, 201; 418/29; 60/452, 491; 180/307, 308

[56] References Cited

U.S. PATENT DOCUMENTS

| | | | |
|---|---|---|---|
| 485,094 | 10/1892 | Dey et al. | 280/216 |
| 1,779,757 | 10/1930 | Streckert | 60/452 X |
| 2,564,237 | 8/1951 | Segsworth | 60/491 |
| 2,716,946 | 9/1955 | Hardy | 60/452 X |
| 4,072,443 | 2/1978 | Heath | 60/452 X |
| 4,290,621 | 9/1981 | Davey | 280/216 X |

FOREIGN PATENT DOCUMENTS 850405  9/1952  Fed. Rep. of Germany ...... 280/216

Primary Examiner—Joseph F. Peters, Jr.
Assistant Examiner—Charles R. Watts
Attorney, Agent, or Firm—Price, Heneveld, Huizenga & Cooper

[57] ABSTRACT

A hydraulic drive system and a bicycle having such system as its drive train, the system including a pump, preferably a vane pump, operably connected to the bicycle pedal crank, the pump delivering pressurized fluid to a hydraulic motor operably connected to the wheel or mechanism to be driven, e.g., the bicycle drive wheel. The pump has an impeller eccentrically disposed in a housing, and a piston-cylinder mechanism is provided to change the eccentricity of the pump impeller with respect to the pump housing as a function of hydraulic system pressure, to thereby maintain a constant input force, e.g., pedal pressure, and rotation rate, for a wide range of speeds. The motor also has an impeller eccentrically disposed in a housing, and a spacer bar connected between the pump and motor housings automatically adjusts the motor impeller eccentricity with changes in the pump impeller eccentricity, thereby further maintaining constant pedal pressure and rotation rate for a wide range of speeds. A pretensioned spring opposes the movement of the piston in the cylinder, thereby requiring that a predetermined pedal pressure level be exerted before the pump and motor eccentricities will change. A lever is provided for manually setting, and varying, the pretension of the spring to thereby set the pedal pressure level at which the pump and motor impeller eccentricities will be charged.

10 Claims, 7 Drawing Figures

HYDRAULIC DRIVE SYSTEM FOR BICYCLES AND THE LIKE

BACKGROUND OF THE INVENTION

The present invention relates to hydraulic drive systems, for vehicles such as bicycles for example, and more particularly to bicycles having a hydraulic variable speed drive mechanism.

In the past, bicycles have typically been driven by chain and sprocket mechanisms. In recent years with the addition of one or more drive sprockets on the crank and a cluster of sprockets on the rear wheel, the bicyclist has been able to select any one of a number of gear ratios by means of a manual shift mechanism which "derails" the chain from one sprocket and moves it to another. Such a shift mechanism can frequently become subject to erroneous operation or result, and can be a clumsy mechanism to operate, the bicyclist sometimes moving the shift mechanism to select a desired gear ratio only to find that the chain has missed the desired gear, sometimes engaging an undesired one. Furthermore, the drive sprocket/sprocket cluster arrangement does not provide a constant pedal pressure or pedal rotation rate over a wide range of bicycle speeds. In other words, the pedal rotation rate and pedal pressure will vary within a given range for any selected gear ratio, from a low rotation rate where considerable pedal pressure may be required to maintain the bicycle's speed to a high pedal rotation rate where the legs have to be moved very rapidly, at a very tiring pace, to maintain the desired speed. Between these extremes, for any particular road condition encountered there is no doubt some gear ratio which will produce a reasonably optimum pedal rotation rate which corresponds to an optimum leg speed and strength for a given individual, but the rider must frequently search for those optimum conditions by shifting the "derailer" mechanism. It can clearly be seen, therefore, that a constant pedal rotation rate and pedal pressure is not maintained across a wide range of bicycle speeds by even the multiple-geared chain and sprocket drive systems.

At least a small number of bicycles have been proposed heretofore employing hydraulic drive mechanisms. In particular, U.S. Pat. No. 4,290,621 issued to Davey discloses a hydraulic multi-speed drive mechanism which employs a plurality of gear pumps and gear motors to drive the bicycle. The drive mechanism of this patent has many of the same disadvantages as the chain/sprocket mechanism discussed above, since it employs a plurality of manually operated valves to adjust the pumping of the hydraulic fluid and the rate at which the hydraulic motor is driven. While it may theoretically be possible for the user of the aforementioned device to continuously adjust the valves to produce a constant pedal pressure and pedal rotation rate for a wide range of bicycle speeds, to do so would be extremely inconvenient and the probable result would be that the bicyclist would not in fact achieve a constant pedal pressure and rotation rate over a wide range of bicycle speeds.

The device of the Davey patent and other prior proposals thus leave a great deal to be desired from a practical standpoint, and do not fulfill much of the promise which a hydraulic drive system really has for bicycles, since they do not provide the essential element of selectably variable "mechanical advantage", particularly by way of mechanisms or means which do not require constant vigilence and manipulation by the rider.

SUMMARY OF THE INVENTION

It is the primary object of this invention to provide an improved hydraulic drive system, for bicycles and other applications, which will automatically maintain a constant actuation force and rotation rate over a wide range of loading, e.g., hills and other terrain conditions, and over a wide range of operating speeds.

It is a further important object of the invention to provide a hydraulic drive system for bicycles and other applications which makes possible the easy and convenient selection and change of actuating (operating) force required by the operator.

It is another object of this invention to provide a hydraulic mechanism which permits the rear wheel of the bicycle to be separated from the frame for service without breaking the fluid connection between the hydraulic pump and hydraulic motor.

The present invention comprises, in a particular embodiment, a bicycle having a vane-type hydraulic pump powered by the conventional pedal and crank arrangement. The vane pump has inlet and outlet ports which are in fluid communication with a hydraulic motor which powers one or more bicycle drive wheels, the pump and motor, and their interconnecting lines being charged with a hydraulic fluid. The vane pump includes a housing having a cylindrical cavity therein in fluid communication with the ports and a cylindrical impeller eccentrically disposed within the housing cavity. A plurality of vanes project radially from the impeller and contact the inner periphery of the cavity. The vanes are spring-loaded to be radially displaceable outward from the impeller, so as to maintain contact with the inside surfaces of the cavity as the impeller rotates eccentrically within the cavity. The vanes define a plurality of segmental chambers between the housing and the impeller, which chambers rotate as the crank and impeller turn in unison. During such rotation of the eccentrically-disposed impeller, each of the chambers will sequentially progressively expand while in fluid communication with the inlet port drawing fluid into the expanding chambers from the inlet port. Each of the chambers then sequentially progressively contracts while in fluid communication with the outlet port, forcing fluid outward from the outlet to the hydraulic motor mechanism. The progressive sequential expansion and contraction of the chambers during impeller rotation is, of course, due to the eccentricity of the impeller with respect to the housing cavity. The hydraulic motor mechanism drives one or more drive wheels of the bicycle, with the fluid pressure in the hydraulic circuit being dependent upon the degree of eccentricity between the impeller and its housing chamber. In accordance with the present invention, this degree of eccentricity is manually variable by the operator so that a desired operating pressure, equating to desired pedal speed and load condition, may be selected. Furthermore, upon selection of any such desired operating pressure, a constant pedal pressure is maintained by automatic adjustment means which continuously varies the impeller eccentricity as necessary to compensate for fluid pressure increases or decreases.

In narrower aspects of the invention, the hydraulic motor comprises a vane-type hydraulic motor essentially like the vane pump described above. The hydraulic motor may also incorporate means for adjusting the eccentricity of the motor impeller with respect to the motor housing cavity.

In other aspects of the invention, the constant pedal pressure at which the bicycle will be maintained may be manually adjusted over a very wide range, to accommodate bicyclists ranging from the weakest to the strongest, and such adjustments may be made on an essentially continuous basis, i.e., in very small increments, or very large increments, as may be desired, in a smooth and continuous manner and without having to interrupt pedalling.

These and other objects, advantages, and features of the present invention will be more fully understood and appreciated by reference to the written specification and appended drawings.

DETAILED DESCRIPTION OF THE PREFERRED EMBODIMENT

Figure 1:
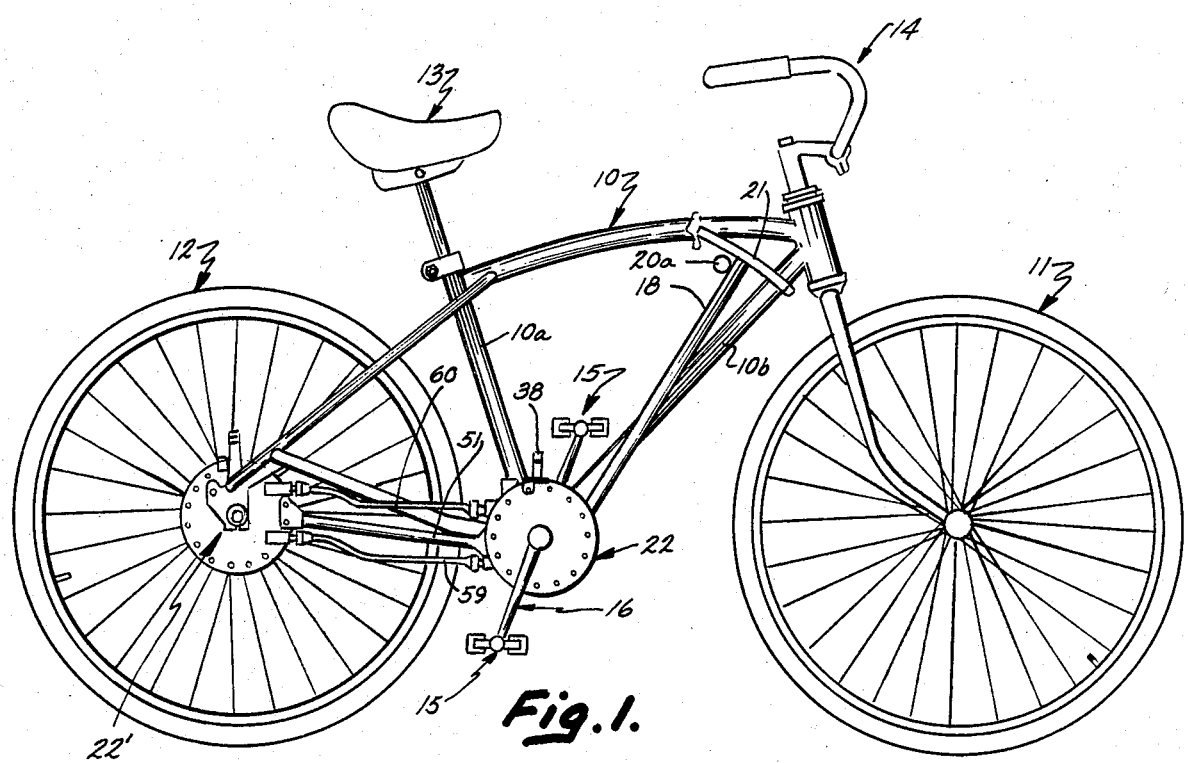
FIG. 1 is a side elevation of a bicycle embodying the present invention.
Figure 4:
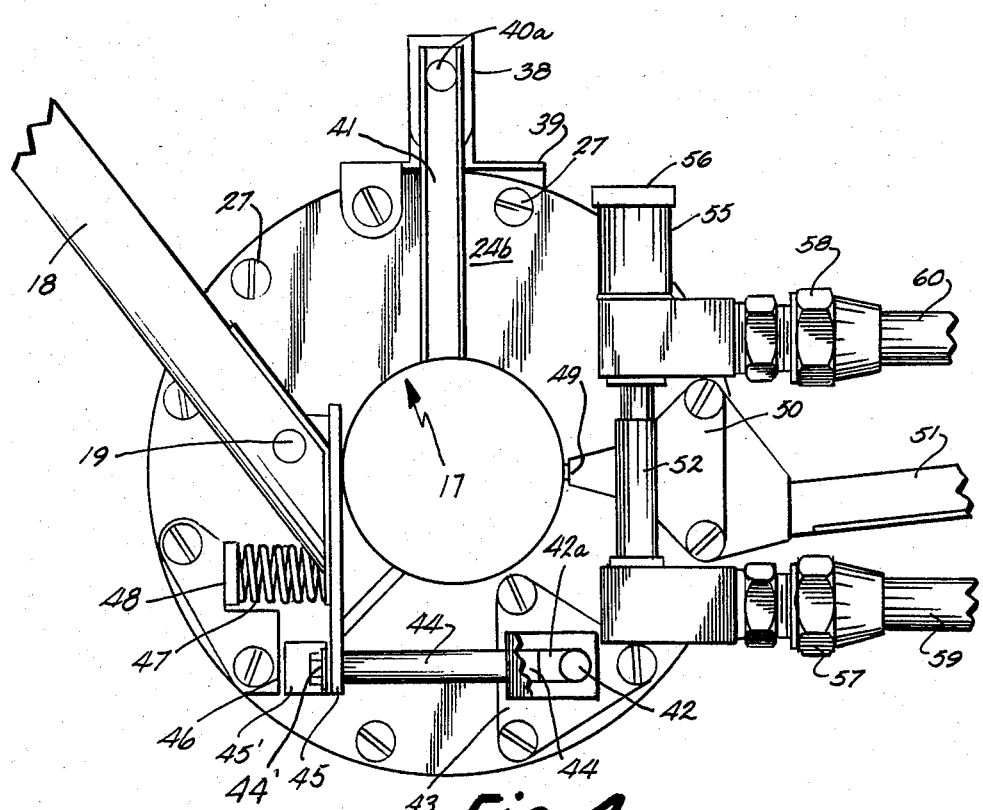
FIG. 4 is a fragmentary, side elevation of the vane pump of the present invention from the side of the pump opposite that shown in FIG. 1, shown with the pedals and crank removed.

Referring to FIG. 1 of the drawing, the bicycle shown is in many ways conventional, having a frame 10, a front wheel 11, a rear wheel 12, seat 13, handlebars 14, pedals 15 and crank 16. With the exception of the mode of powering the rear drive wheel, the operation and interaction of the above elements are well known. The drive mechanism shown in FIG. 1 comprises a vane-type hydraulic pump 22 and a vane-type hydraulic motor 22', both of which will be described in more detail below. The motor 22' and pump 22 are held in spaced relationship by a spacer bar 51 and are connected by oil pressure line 59 and return oil line 60. Both the pump 22 and the motor 22', as well as the oil lines 59, 60, are filled with a light hydraulic oil which is preferably of very low viscosity. An oil reservoir 55 with cap 56 shown in FIG. 4 is provided to keep the hydraulic system fully charged.

Figure 2:
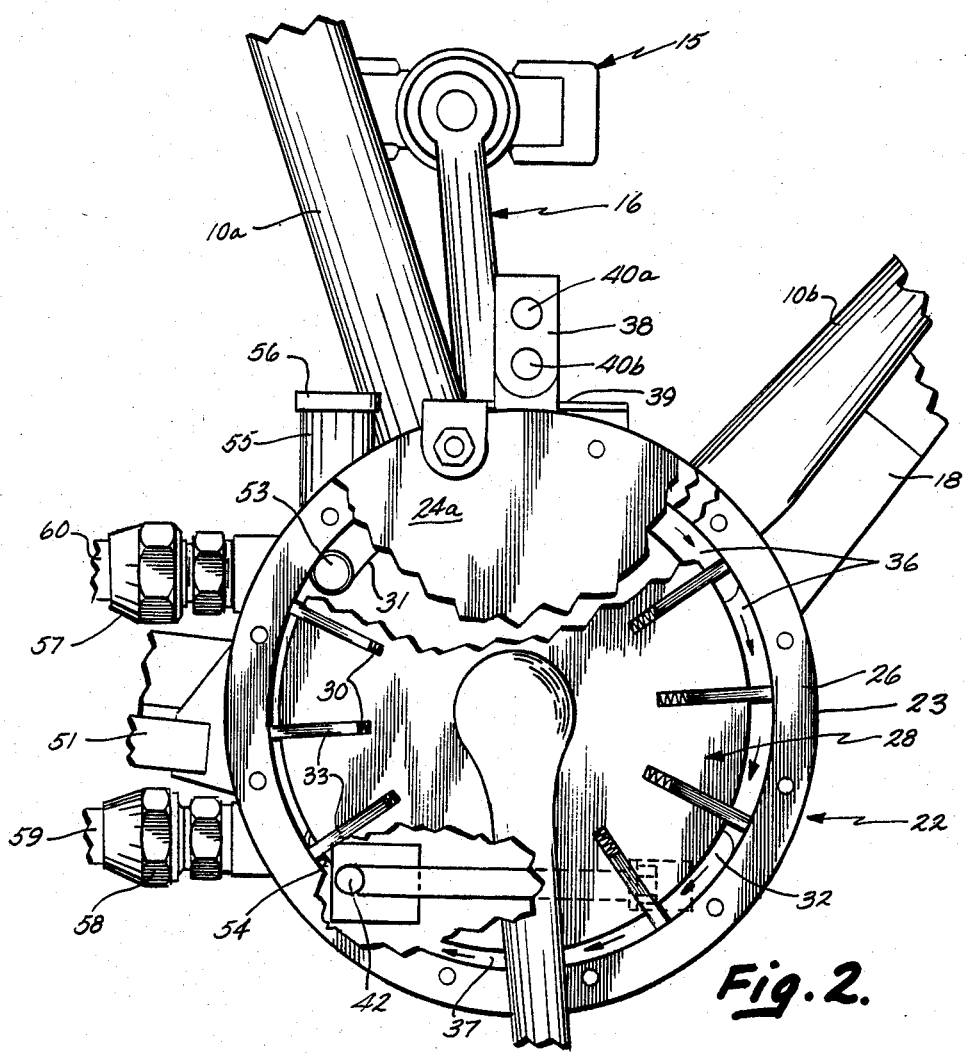
FIG. 2 is a fragmentary, side elevation, partly in section, of the vane pump unit.

Referring specifically to FIG. 2, the pump 22 of the present invention comprises a housing 23 which includes two side plates 24(a), 24(b) held in spaced relationship by an annular plate spacer or case 26. Plates 24(a), 24(b) and plate spacer 26 are held together by fastening means such as screws 27 shown in FIG. 4. Plates 24(a) and 24(b) have central openings 24(a) and 25(b) respectively to receive crank 16, and conventional seal means (e.g., resilient washer or chevron seals, described subsequently) should be used to prevent hydraulic leakage therebetween.

The volume enclosed by plates 24(a) and 24(b) and spacer 26 forms a cylindrical cavity 37. Disposed in cavity 37 is an impeller 28. Vanes 33 extend radially from impeller 28, the vanes being inserted in radial vane slots 30 in impeller 28.

Because the rotational speed of impeller 28 is not high enough to create sufficient centrifugal force to hold vanes 33 in contact with the surfaces of cavity 37 radially outward from impeller 28, vane springs 34 are employed to bias vanes 33 radially outwardly from impeller 28.

Figure 3:
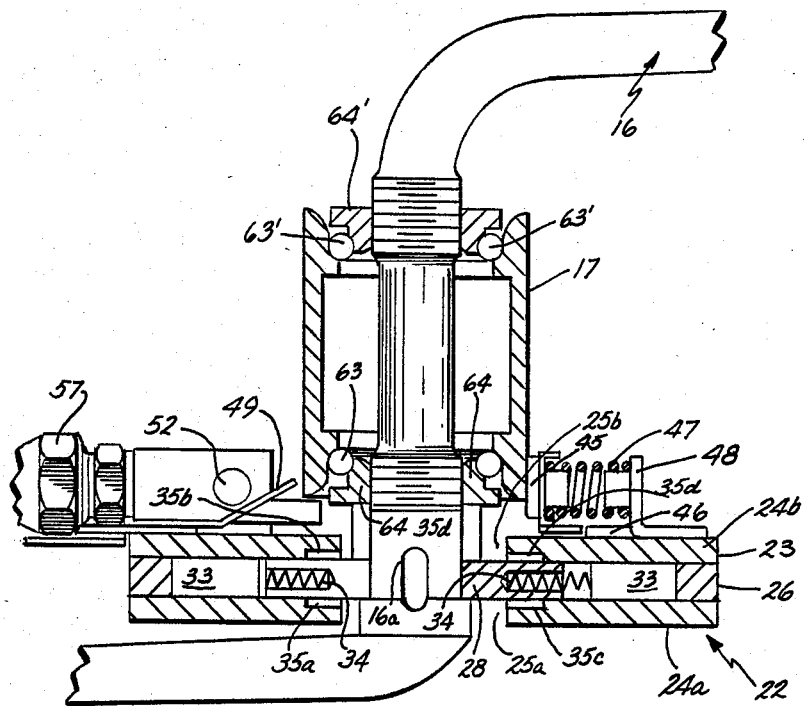
FIG. 3 is a fragmentary, sectional view of the structure shown in FIG. 2.

The center of impeller 28 has a bore (not shown) therethrough and is keyed to crank 16 at impeller key slot 16(a) shown in FIG. 3. Thus, impeller 28 will turn with crank 16 as the latter is rotated by pedalling, the crank being rotatably supported on the bicycle frame in the customary way by bearings described hereinafter.

As shown in FIGS. 2 and 3, impeller 28 is generally cylindrical or disc-shaped, the center of the cylinder being positioned eccentrically with respect to the center of cavity 37, as shown in FIG. 2. Also shown in FIG. 2 are manifold slots 31 and 32 on plate 24(b). As crank 16 and impeller 28 are turned in the clockwise direction as shown in FIG. 2, vanes 33 will draw hydraulic fluid through pump inlet 53 from return line 60 into a chamber 36 roughly at the ten o'clock position as shown in FIG. 2. As chambers 36 move in the clockwise direction from the ten o'clock position, they expand until they reach a point near the two o'clock position as shown in FIG. 2. Between the ten o'clock position and the two o'clock position, chambers 36 are in fluid communication with pump inlet 53 by means of manifold slot 31 in plate 24(b). Manifold slot 31 is an arcuate groove in plate 24(b) and permits fluid to flow around vanes 33 and into expanding chambers 36 between the ten and two o'clock positions as shown in FIG. 2. Therefore, as chambers 36 expand while moving from the ten o'clock to the two o'clock position, they will draw additional hydraulic fluid through inlet opening 53 and around the vanes 33. As chambers 36 rotate from about the four o'clock to the eight o'clock positions, chambers 36 progressively contract due to the eccentricity of impeller 28 with respect to cavity 37. As the fluid in the chambers 36 between the four o'clock and the eight o'clock positions is subjected to increasing pressure by the decreasing volume of chambers 36, the pressurized fluid is forced through manifold slot 32 on plate 24(b) and out pump outlet 54, manifold slot 32 being an arcuate groove in plate 24(b), disposed at, and interconnecting, the four o'clock and eight o'clock positions. As chambers 36 move between the eight and ten o'clock positions, they are of relatively constant volume; they are filled with fluid and they repeat the cycle as described above once they pass the ten o'clock position and the pump inlet 53.

The function of manifold slots 31 and 32 is to maintain the chambers of expanding volume in fluid communication with inlet port 53 and to maintain the chambers of contracting volume in fluid communication with the outlet port 54. As one skilled in the art will realize, such manifolding means is needed, and conventionally utilized, due to the incompressible nature of the fluid.

The pressurized fluid delivered from pump 22 through pressure oil line 59 can be used to drive practically any desired type of hydraulic motor operably connected to rear wheel 12. Of course, a hydraulic motor also can be used to drive more than one rear wheel, for instance, on a three-wheeled bicycle.

From FIG. 2, it should be apparent that the pressure of fluid delivered to pump outlet 54 will depend upon the eccentricity of impeller 28 with respect to cavity 37, assuming the applied pedal force remains the same. The more eccentric impeller 28 is with respect to cavity 37, the more pressurized the fluid delivered to pump outlet 54 will be, with uniform pedal force. Conversely, the less eccentric impeller 28 is with respect to cavity 37, the less pressurized the fluid will be which is delivered to pump outlet 54 (again assuming uniform pedal force). Thus, impeller 28 is maintained at a constant eccentricity with respect to cavity 37, the pressure of the fluid delivered to pump outlet 54 must be increased if the bicycle is to be driven uphill, i.e., pedal force must increase. Likewise, if the eccentricity is held constant and the bicycle is driven on level ground, pedals 15 and crank 16 would have to be rotated at a progressively faster rate to increase the speed of the bicycle. These characteristics, common in conventional bicycles known heretofore, are not necessarily desirable, as they require the user either to exert high pedal force and/or to move his legs too quickly at a given speed, either condition being unnecessarily tiring.

Therefore, the present invention provides means for changing the eccentricity of impeller 28 with respect to cavity 37. Basically, eccentricity is varied by operation of a piston 44 which is slidably received within cylinder 42, which is in fluid communication with manifold groove 32. Cylinder 42 is fixedly attached to plate 24(b) while piston 44 is fixedly attached, by a bolt 44' (FIG. 4), to a piston anchor bracket 45 which in turn is fixedly attached to crank housing 17.

As shown in FIG. 3, crank 16 extends through crank housing 17 and is held in spaced relationship to the walls of crank housing 17 by bearings 63, 63' and bearing races 64 and 64', races 64, 64' being threadably secured to crank 16 as shown in FIG. 3. Since impeller 28 is fixedly attached to crank 16, impeller 28 cannot move laterally with respect to crank housing 17.

By contrast, pump housing 23 is not fixedly attached to either crank housing 17 or crank 16. Instead, pump housing 23 is suspended from crank housing 17 by suspension stand 41 and suspension bracket 39. Suspension bracket 39 is fixedly attached to pump housing 23 as shown in FIGS. 2 and 4. Suspension bracket 39 is in turn pivotally attached to and received between the arms of suspension clevis 38 by clevis pin 40(b) shown in FIG. 2. Suspension clevis 38 is also pivotally attached to suspension stand 41 by clevis pin 40(a). As shown in FIG. 3, spacer 26 on crank 16 also maintains the pump 22 in spaced relation to crank housing 17.

Figure 5:
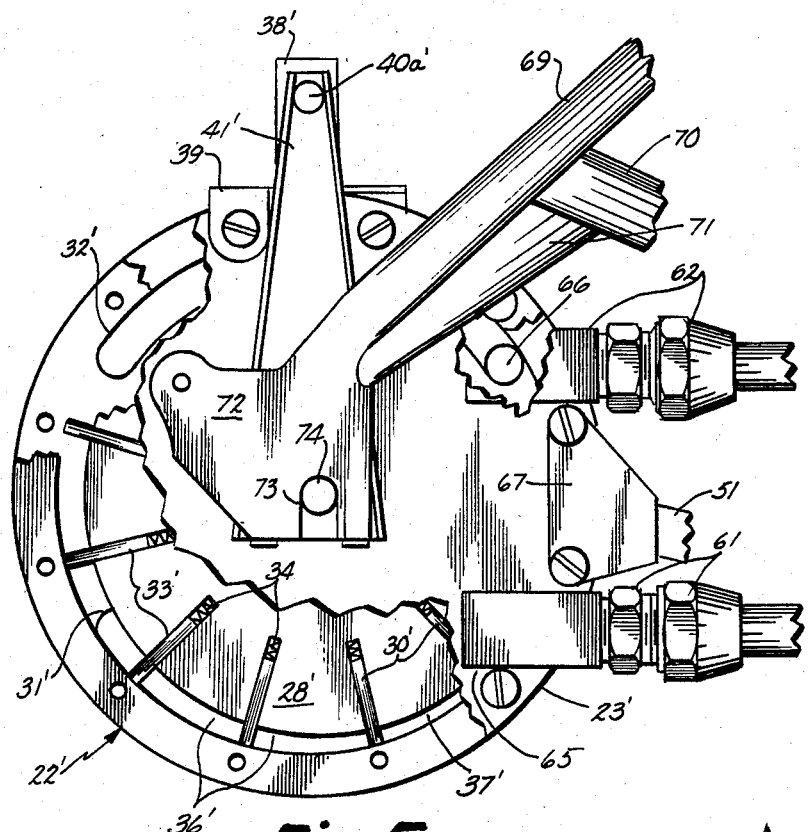
FIG. 5 is a fragmentary, side elevation, partly in section, of the hydraulic motor unit of the present invention.
Figure 6:
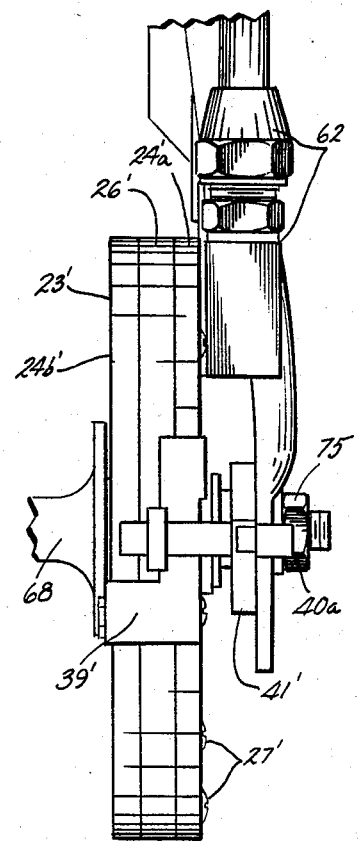
FIG. 6 is a fragmentary, overhead plan view of the hydraulic motor unit shown in FIG. 5.

Further details of the suspension stand apparatus can be seen in FIGS. 5 and 6 which illustrate a virtually identical arrangement used on the rear wheel hydraulic motor mechanism of the bicycle. As can be seen from a top view of the suspension apparatus as shown in FIG. 6, suspension clevis 38' receives suspension bracket 41 and housing 23' is suspended from clevis pin 40(a)' by suspension stand 41'.

Referring back to FIG. 4, it should be seen that as fluid pressure increases in the contracting chambers 36 in fluid communication with manifold slot 32 and cylinder 42, piston 44 will force housing 23 in a rearward direction since the top of the piston is exposed to the pressurized fluid. As piston 44 thus moves, housing 23 will simultaneously pivot about suspension stand 41 on clevis pins 40(a) and 40(b). Referring to FIG. 2, it can be seen that as housing 23 is shifted rearwardly, the eccentricity of impeller 28 with respect to cavity 37 is reduced. As indicated earlier, when the eccentricity is reduced, the pump output pressure is reduced. As shown in FIG. 4, the pressure at which piston 44 will move can be predetermined by selecting a spring 47 of suitable tension to oppose the rearward movement of housing 23 at a given amount of fluid pressure. Spring 47 is biased rearward against piston anchor bracket 45 and forward against return spring bracket 48. Therefore, as the pressure in cylinder 42 increases, the force of spring 47 will oppose the rearward movement of housing 23.

It should be evident that, as is well known in pumps generally, there are practical limits to the allowable movement of housing 23 around impeller 28. For instance, if housing 23 is moved too far rearwardly, the pump will no longer pump pressurized fluid out of pump outlet 54 because the contracting chambers 36 containing pressurized fluid will no longer be in fluid communication with outlet port 54. In addition, the movement of pump housing 23 too far forward will cause it to contact impeller 28, potentially causing damage either to impeller 28, vanes 33 or vane springs 34. Therefore, it is desirable to provide a stop in order to limit the allowable forward movement of housing 23 with respect to impeller 28. It is for this purpose that stop 49, shown in the preferred embodiment of FIGS. 3 and 4, is provided, and stop 46 is provided to limit the allowable rearward movement of housing 23 with respect to impeller 28, stop bracket 46 preferably being formed integrally with return spring bracket 48. The rearward movement of housing 23 beyond an established limit is stopped by a projection 45' on piston anchor bracket 45 when projection 45' meets stop bracket 46.

It is desirable that the fluid pressure produced by pump 22 remain fairly constant, at the level selected by the operator. As the fluid pressure increases as a function of load, as when the bicycle is driven uphill, for instance, the pressure in cylinder 42 will increase and force piston 44 against return spring 47, which in turn will move the pump housing in a direction decreasing the eccentricity of impeller 28 with respect to cavity 37. This decrease in eccentricity has the result of maintaining the fluid pressure at a constant value as the bicycle is driven uphill, thereby enabling the bicyclist to maintain a constant pedal pressure and a constant pedal rotation rate, the speed of the bicycle decreasing commensurately.

Figure 7:
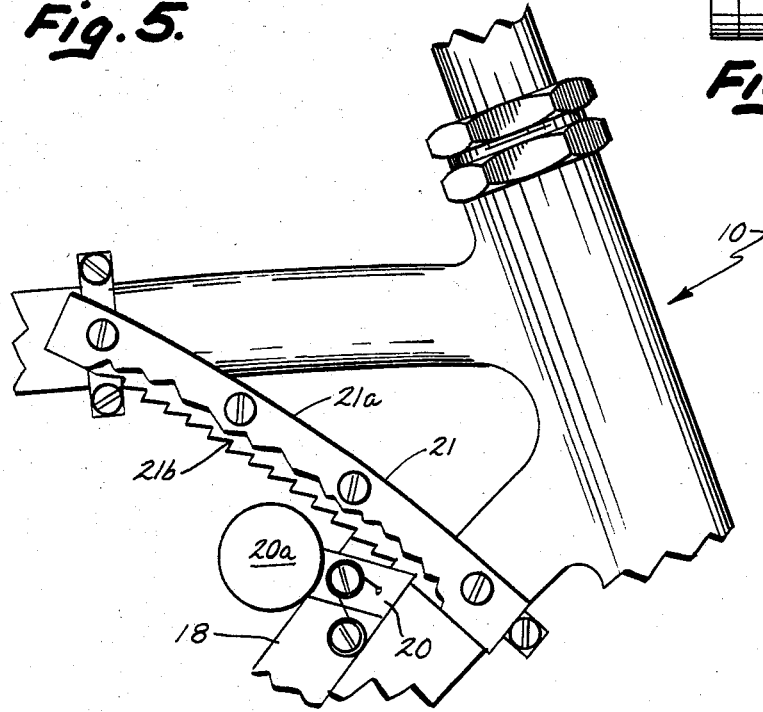
FIG. 7 is a fragmentary, side elevation, partly in section, of an exemplary manual means for selecting, and adjusting the constant pedal pressure at which the bicycle will be operated.

Because the desired pedal rotation rate or pedal pressure may vary from individual to individual, lever means such as control lever arm 18 are employed to adjust the pretension of return spring 47 acting between return spring bracket 48 and piston anchor bracket 45. As shown in FIG. 4, control lever 18 is pivotally connected by control lever pivot pin 19 to piston anchor bracket 45. As seen in FIGS. 1 and 7, control lever 18 extends upwardly to a ratchet plate 21, where the pretension of spring 47 can be adjusted by lifting the counterbalancing handle 20a and moving ratchet dog 20 along ratchet plate 21. Ratchet plate 21 can be fastened by screws and clamps to the bicycle frame as shown in FIG. 7 and can comprise a series of stacked and overlapping guide plates 21(a) without teeth alongside an indexing plate 21(b) with teeth, as shown in FIG. 7.

It should be noted that a variety of means can be employed to adjust the pretension of return spring 47 against return spring bracket 48. Control lever 18, ratchet dog 20, and ratchet plate 21 illustrate merely one preferred embodiment.

As was mentioned above, the pressurized fluid produced by vane pump 22 can be utilized in a variety of hydraulic motors operably connected to rear wheel 12. However, as shown in FIG. 5, a vane-type motor 22' is well suited for this purpose and has certain advantages which will become apparent.

Vane motor 22' (FIGS. 5 and 6) includes the same basic elements as vane pump 22 but operates in an opposite fashion, being rotatably driven by the pressurized fluid applied. Vane motor 22' includes an impeller 28', a housing 23' made from plates 24(a)' and 24(b)' with spacer 26' interposed between said plates. Plates 24(a)' and 24(b)' and spacer 26' define a cavity 36' in which impeller 28' is disposed. Plates 24(a)' and 24(b)' have openings (not shown) similar to openings 25(a) and 25(b) in the corresponding plates in the vane pump. The openings through plates 24(a)' and 24(b)' receive the axle assembly 68 to which impeller 28' is fixedly attached.

A motor inlet opening (not shown) and motor outlet opening 66 are provided to receive pressurized fluid and expel unpressurized fluid from the motor, respectively. Vane motor 22' further includes vanes 33' which radially extend outwardly from vane slots 30' in impeller 28'. Vanes 33' are biased outwardly against the sides of cavity 36' by vane springs 34'. Vanes 33', impeller 28' and housing 23' define a plurality of chambers 36' which expand in volume as they move from about the four o'clock to about the eight o'clock position shown in FIG. 5 and contract in volume from the ten o'clock to about the two o'clock position as shown in Fig. as impeller 28' is rotated in the clockwise position. Chambers 36' which are expanding should be in fluid communication with the aforementioned motor inlet provided by motor inlet fitting 61. Manifold slot 31', comprising an arcuate groove in plate 24(b)', serves this function. Similarly, vane manifold 32' maintains chambers 36' which are contracting in volume in fluid communication with motor outlet 66 and motor outlet fitting 62.

The operation of vane motor 22' should be apparent at this point. Basically, the pressurized fluid entering through the motor inlet fills the chambers of expanding volume by means of vane manifold 31', thereby forcing impeller 28' to turn in the clockwise direction as shown in FIG. 5. As vanes 33' and chambers 36' reach a point where the volume of chambers 36' begin to contract, the chambers 36' come into fluid communication with motor outlet 66 through vane manifold 32', thereby permitting fluid to be forced out of the vane motor 22'.

The amount of work required to rotate motor impeller 28' will depend upon the degree of eccentricity of impeller 28' with respect to cavity 37'. The greater the eccentricity, the less work will be required to turn impeller 28' in cavity 37'. Of course, the eccentricity should always be maintained such that motor inlet opening 65 is maintained in fluid communication with those chambers 36' of expanding volume. Otherwise, the pump would turn in the direction opposite that shown in FIG. 5, and the fluid would be short-circuited (relieved) to the motor outlet 66. For a given fluid pressure, more work would be required to turn impeller 28' in cavity 37' if the eccentricity of impeller 28' with respect to cavity 37' is reduced. Again, motor inlet 65 should be in fluid communication with those chambers 36' which are expanding in volume as impeller 28' rotates.

Therefore, if the eccentricity of vane motor 22' is varied, the amount of work required to turn impeller 28' can be varied. A piston-cylinder arrangement disclosed previously in connection with the vane pump 22 could be used to vary the eccentricity of impeller 28' with respect to motor housing 23'. However, a spacer bar 51 can conveniently be used as well. As shown in FIG. 1, spacer bar 51 extends between pump housing 23 and motor housing 23' and maintains the two in fixed, spaced relationship with each other. Therefore, as the piston-cylinder arrangement on vane pump 22 causes vane pump housing 23 to move, spacer bar 51 will cause motor housing 23' to move as well. The length of spacer bar 51 should be selected such that impeller 28' will never contact the radially interior surfaces of spacer 26' and so that the eccentricity of impeller 28' in cavity 36' will be such that motor inlet 65 will be in fluid communication with chambers 36' of expanding volume and motor outlet 66 will be in fluid communication with chambers 36' of contracting volume.

Spacer bar 51 if properly sized will allow the simultaneous reduction of the pedal pressure required to operate vane pump 22 and the work required to operate vane motor 22'.

Motor housing 23' is suspended from a suspension stand 41' by clevis 38' and clevis pin 40(a)' by suspension bracket 39' and suspension pin 40(b)' in a manner previously disclosed.

In one specific example of a preferred embodiment, impellers 28, 28' are 4.75 inches in diameter and cavities 37, 37' are 5.125 inches in diameter. The center of pump housing 23 is placed 0.094 inches forward from the center of impeller 28, and pump housing 23 can be moved rearward to a point where its center is 0.032 inches forward of the center of impeller 28. Similarly, the center of motor housing 23' is placed 0.094 inches rearward from the center of impeller 28', and motor housing 23' is movable forward to a point where the center of motor housing 23' is 0.032 inches rearward from the center of impeller 28'.

When the housings are moved completely rearward, that is, the center of housing 23 is 0.032 inches forward from the center of impeller 28, there should be about 15 inches of travel for about one turn of crank 16 if wheel 12 is 24 inches in diameter. On the other hand, if the center of pump housing 23 is fully forward, that is, the center of pump housing 23 is 0.157 inches forward from the center of impeller 28, there should be about five turns of the wheel, or about 377 inches, for every turn of crank 16, provided rear wheel 12 is 24 inches in diameter. Of course, the above calculations assume rear housing 23' moves corresponding distances with respect to impeller 28' due to the interconnection of the housings by spacer bar 51.

Of course, there are an infinite number of settings between the two settings described above. Therefore, for a given pedal pressure selected by control lever 18 there is a wide range of speed possible with no manual shifting required. Furthermore, the changes between the various speeds will be gradual. Thus, there is no incremental change in either pedal pressure or speed as is characteristic of earlier hydraulic and sprocket mechanisms.

To ensure that little or no fluid will leak out of the hydraulic system of the present invention, annular gaskets 35(a) and 35(b) (FIG. 3) can be positioned between pump impeller 28 and housing 23, encircling openings 25(a) and 25(b) respectively. Advantageously, annular grooves 35(c) and 35(d) can be provided in plates 24(a) and 24(b) around openings 25(a) and 25(b) respectively to receive such gaskets. Similar gaskets can be disposed between motor impeller 28' and plates 24(a)' and 24(b)' to prevent fluid from leaking from the motor. Any leakage of fluid will result in fluid being drawn from reservoir cup 55, which is in fluid communication with pump inlet opening 53.

The hydraulic system of the present invention can be installed on a standard bicycle frame without modification of the frame. However, the frame can be modified slightly to provide means of removing the rear tire without breaking the fluid circuit.

Referring to FIG. 5, one-half of a bifurcated rear wheel support is shown which includes frame elements 69, 70, and 71, and a flange 72 with a slot 73 therein for receiving a threaded rod 74 which extends through rear axle 68. The primary modification illustrated is the orientation of slot 73. In prior art bicycle frames, axle support slots such as slot 73 were oriented at an acute angle to the vertical with the mouth of the slot generally oriented toward the front of the bicycle. Such a slot would be unacceptable in the present design if easy removal of the rear tire is desired, since the prior art slot would require that the wheel be moved forward almost an inch. This would entail disconnecting spacer bar 51, and perhaps oil lines 59 and 60 as well if they were not made from a flexible material. Having slot 73 extend generally vertically downward permits the rear axle to be swung straight down (actually, on a long arc) out of the frame slot. To do so, it is preferable to remove return spring 47, so as to remove pressure from spacer bar 51, and machine screw 44 should also be removed, to disconnect piston 44 from bracket 45. Thus, if nut 75 shown in FIG. 6 is removed, threaded axle rod 74 can be slid downwardly until suspension stand pin 40(a)' comes into contact with the top of plate 72, which should provide enough clearance to remove the tire. As will be understood, the modification of the frame shown in FIG. 5 is also done on the other half of the bifurcated rear wheel support not shown.

The frame elements 69, 70, and 71 are shown with elements 70 and 71 at an angle with one another. In a conventional bicycle, the frame elements 70 and 71 would comprise one horizontal piece interconnecting plate 72 with crank housing 17. Having elements 70 and 71 at an angle to each other permits easy installation of motor outlet fittings 62, of motor inlet fittings 61, and of rear spacer bracket 67 which connects spacer bar 51 to motor housing 23'.

Of course, it is understood that the above disclosure is merely of particular examples of a preferred embodiment of the invention, and that various other embodiments as well as many changes and alterations may be made without departing from the underlying concepts and within the broader aspects of the invention.

The embodiments of the invention in which an exclusive property or privilege is claimed are defined as follows:

1. In a bicycle having a frame for supporting at least one drive wheel, pedals mounted on a drive crank for applying power to propel the bicycle, and a crank housing carried on said frame and having means for rotatably mounting said crank, the improvement comprising:
   hydraulic motor means operably connected to said drive wheel to rotatably drive said wheel, said motor means having fluid inlet and outlet ports;
   a vane-type hydraulic pump having inlet and outlet ports, a housing, and an impeller eccentrically positioned within said housing and operatively connected to said crank for rotation therewith;
   fluid conduit means coupling the pump outlet port to the motor inlet port and coupling the pump inlet port to the motor outlet port; and
   means for adjusting the eccentricity of said impeller in said housing as said fluid pressure changes in response to changed load, so as to maintain a constant pedal force for rotation of said crank and of said impeller under a range of load conditions, including:
   a cylinder fixed in position with respect to said pump housing and in fluid communication with the pressure side of said pump;
   a piston means movably received within said cylinder to move as the pressure in said cylinder changes, said piston means operatively connected to said bicycle frame so that said piston means forces said pump housing to move relative to said impeller as the cylinder pressure changes, thereby adjusting said eccentricity as a function of said pressure changes;
   biasing means to bias said piston means and housing against movement as pressure increases; and
   manual means to selectively adjust the force exerted by said biasing means against said piston means and housing to thereby raise or lower the amount of pressure required in said cylinder to change said eccentricity.

2. The improvement for a bicycle as defined in claim 1 wherein said piston means is secured to said crank housing of said frame by a first bracket attached to said crank housing, wherein said cylinder is attached to said pump housing, wherein said biasing means is disposed between said first bracket and a second bracket attached to said pump housing, and wherein said manual means comprises a lever pivotally attached to said first bracket, said biasing means being disposed to act upon the lever such that pivotal movement of said lever is applied to said biasing means and is transmitted thereby to said first bracket and said piston means.

3. A bicycle as defined in claim 2 which further comprises a pump housing suspension mechanism including a first suspension bracket attached to said crank housing, a second suspension bracket attached to said pump housing, and a suspension member pivotally attached to said suspension stand and to said suspension bracket such that said housing is pivoted on said suspension member by said piston and said cylinder means through said biasing means to move said housing relative to said impeller in a manner which changes said eccentricity.

4. A bicycle as defined in claim 3 which further comprises at least two stop means, one of said stop means for preventing pivotal movement of said housing in one direction beyond a first predetermined point, the other of said stop means for preventing pivotal movement of said housing in a second direction beyond a second predetermined point.

5. A bicycle as defined in claim 1 wherein said hydraulic motor means comprises a vane-type motor, said motor including a housing having inlet and outlet ports and having a generally cylindrical cavity therein in fluid communication with said ports, a generally cylindrical impeller eccentrically disposed within said cavity and having a diameter less than the diameter of said cavity, means for physically connecting said impeller with said drive wheels for rotation of said drive wheels as said impeller is turned, a plurality of vane means projecting outward from said impeller toward the surfaces of said cavity, said vane means defining a plurality of chambers between said housing and said impeller, each of said chambers during rotation of said impeller sequentially and progressively expanding in volume due to said eccentricity and each of said expanding chambers being in fluid communication with said motor inlet port, said expanding chambers receiving pressurized fluid from said pump through said inlet port forcing said impeller to rotate, said chambers then sequentially and progressively contracting in volume upon impeller rotation and each of said contracting chambers coming into fluid communication with said outlet port during impeller rotation, said conduit means connecting said outlet port of said motor to said inlet port of said pump, said contracting motor chambers forcing said fluid through said motor outlet port and through said conduit into said pump inlet port.

6. The bicycle as defined in claim 5 which further comprises means for adjusting said eccentricity of said motor impeller with respect to said motor housing.

7. The bicycle as defined in claim 6 wherein said means for adjusting said eccentricity of said motor housing with respect to said motor impeller comprises a spacer bar fixedly attached to one end to said pump housing and at the other end to said motor housing, such that movement of said pump housing forces said motor housing to move thereby changing the eccentricity of said motor housing with respect to said impeller.

8. The bicycle as defined in claim 7 wherein said spacer bar maintains the eccentricity of said motor housing with respect to said motor impeller in predetermined relationship to the eccentricity of said pump housing with respect to said pump impeller.

9. In a bicycle having a frame for supporting at least one drive wheel, pedals mounted on a drive crank for applying power to propel the bicycle, said crank rotatably mounted within a crank housing carried on said frame, the improvement comprising:
 a hydraulic motor means operably connected to rotatably drive said drive wheel, said motor means having fluid inlet and outlet ports;
 a hydraulic pump having inlet and outlet ports, and fluid conduit means coupling the pump outlet port to the motor inlet port and coupling the pump inlet port to the motor outlet port;
 said pump including a housing having a generally cylindrical cavity in fluid communication with said pump inlet and outlet ports, a rotatable impeller eccentrically disposed within said cavity and operably connected with said crank for rotation thereby as said crank is turned;
 said motor including a housing providing said inlet and outlet ports and having a generally cylindrical cavity therein in fluid communication with said ports, said motor having a generally cylindrical impeller eccentrically disposed within said cavity, and means for physically connecting said impeller with said drive wheels for rotation of said drive wheels as said impeller is turned; and
 means for adjusting the eccentricity of at least one of said impellers with respect to its housing, including a cylinder attached to said housing and in fluid communication therewith; a piston slidably received within said cylinder with one end of said piston operably connected to said frame; biasing means to bias said piston toward one position in said cylinder; and manual means to selectively adjust said biasing means, whereby said piston and cylinder will move said housing with respect to said impeller against the force of said biasing means when the fluid pressure in said housing changes and the particular pressure at which said piston will respond to move said housing may be selectively changed by said manual means.

10. In a bicycle having a frame for supporting at least one drive wheel, pedals mounted on a drive crank for applying power to propel the bicycle, said crank rotatably mounted within a crank housing carried on said frame, the improvement comprising:
 a hydraulic motor means operably connected to rotatably drive said drive wheel, said motor means having fluid inlet and outlet ports;
 a hydraulic pump having inlet and outlet ports, and fluid conduit means coupling the pump outlet port to the motor inlet port and coupling the pump inlet port to the motor outlet port;
 said pump including a housing having a generally cylindrical cavity in fluid communication with said pump inlet and outlet ports, a rotatable impeller eccentrically disposed within said cavity and operably connected with said crank for rotation thereby as said crank is turned;
 said motor including a housing providing said inlet and outlet ports and having a generally cylindrical cavity therein a fluid communication with said ports, said motor having a generally cylindrical impeller eccentrically disposed within said cavity, and means for physically connecting said impeller with said drive wheels for rotation of said drive wheels as said impeller is turned;
 means interconnecting said pump and said motor to maintain selected relative amounts of impeller-to-housing eccentricity therebetween; and
 pressure-responsive means associated with one of said pump and motor housings to adjust the eccentricity of said one housing with respect to its impeller, said pressure-responsive means located at least partially outside said housing and having manually actuable means to select the pressure level at which said pressure-responsive means responds to adjust said eccentricity.

* * * * *